(12) United States Patent
Jang et al.

(10) Patent No.: US 9,701,176 B2
(45) Date of Patent: Jul. 11, 2017

(54) WING KNOB ADJUSTING DEVICE FOR AIR VENT

(75) Inventors: Han Ju Jang, Hwaseong-si (KR); Jong Beom Ma, Cheonan-si (KR)

(73) Assignees: Hyundai Motor Company, Seoul (KR); Kia Motors Corporation, Seoul (KR); Nifco Korea Inc., Cheonan-si (KR)

( * ) Notice: Subject to any disclaimer, the term of this patent is extended or adjusted under 35 U.S.C. 154(b) by 988 days.

(21) Appl. No.: 13/475,185

(22) Filed: May 18, 2012

(65) Prior Publication Data

US 2013/0165034 A1    Jun. 27, 2013

(30) Foreign Application Priority Data

Dec. 23, 2011  (KR) .................. 10-2011-0141356

(51) Int. Cl.
*F24F 13/16* (2006.01)
*B60H 1/34* (2006.01)

(52) U.S. Cl.
CPC ... *B60H 1/3428* (2013.01); *B60H 2001/3471* (2013.01)

(58) Field of Classification Search
CPC .......... B60H 1/28; B60H 1/34; B60H 1/3428; B60H 2001/3471; B60H 2001/3478
USPC ................. 454/152, 153, 154, 155
See application file for complete search history.

(56) References Cited

U.S. PATENT DOCUMENTS

| | | | | |
|---|---|---|---|---|
| 3,771,559 A | * | 11/1973 | Alley ................... | 137/601.06 |
| 5,338,252 A | * | 8/1994 | Bowler et al. ........ | 454/155 |
| 6,497,616 B2 | * | 12/2002 | Yamaguchi .......... | 454/155 |
| 6,589,110 B2 | * | 7/2003 | Tanabe et al. ....... | 454/155 |
| 6,736,719 B1 | * | 5/2004 | Gehring et al. ..... | 454/155 |
| 2001/0031619 A1 | * | 10/2001 | Yabuya et al. ...... | 454/155 |
| 2007/0111653 A1 | | 5/2007 | Endou | |

FOREIGN PATENT DOCUMENTS

| | | |
|---|---|---|
| JP | 2005-199898 A | 7/2005 |
| JP | 4327150 B2 | 6/2009 |
| KR | 10-2008-0027074 A | 3/2008 |
| KR | 10-0841547 B1 | 6/2008 |
| KR | 10-2010-0072810 A | 7/2010 |
| KR | 10-2010-0077961 A | 7/2010 |
| KR | 10-2011-0071502 A | 6/2011 |

* cited by examiner

*Primary Examiner* — Gregory Huson
*Assistant Examiner* — Dana Tighe
(74) *Attorney, Agent, or Firm* — Morgan Lewis & Bockius LLP (57) ABSTRACT

Provided is a wing knob adjusting device for an air vent, including a housing mounted with an air discharge part, a front wing mounted in the air discharge part, a rear wing mounted in front of the front wing, and an actuator vertically rotating the front wing or the horizontally rotating the rear wing, wherein the actuator includes fixing members mounted at top and bottom portions of the air discharge part, respectively, a knob link of which the top portion may be upwardly inserted into the fixing member, the bottom portion may be vertically coupled rotatably with the front wing, and the center may be horizontally coupled rotatably with the rear wing, an actuating knob slidably mounted in the rear wing to rotate the knob link vertically or horizontally, and a connecting rod connecting the knob link with the actuating knob so as to interconnect them.

11 Claims, 11 Drawing Sheets

WING KNOB ADJUSTING DEVICE FOR AIR VENT

CROSS-REFERENCE TO RELATED APPLICATION

The present application claims priority to Korean Patent Application No. 10-2011-0141356, filed on Dec. 23, 2011 in the Korean Intellectual Property Office, the entire contents of which is incorporated herein for all purposes by this reference.

BACKGROUND OF THE INVENTION

Field of the invention

The present invention relates to a wing knob adjusting device for an air vent, and more particularly, to a wing knob adjusting device for an air vent, in which a rotational structure of a wing knob for an air vent is improved to increase its operability.

Description of Related Art

Generally, a wing knob adjusting device for an air vent for a vehicle is a device for adjusting external air introduced into a vehicle.

Figure 1:
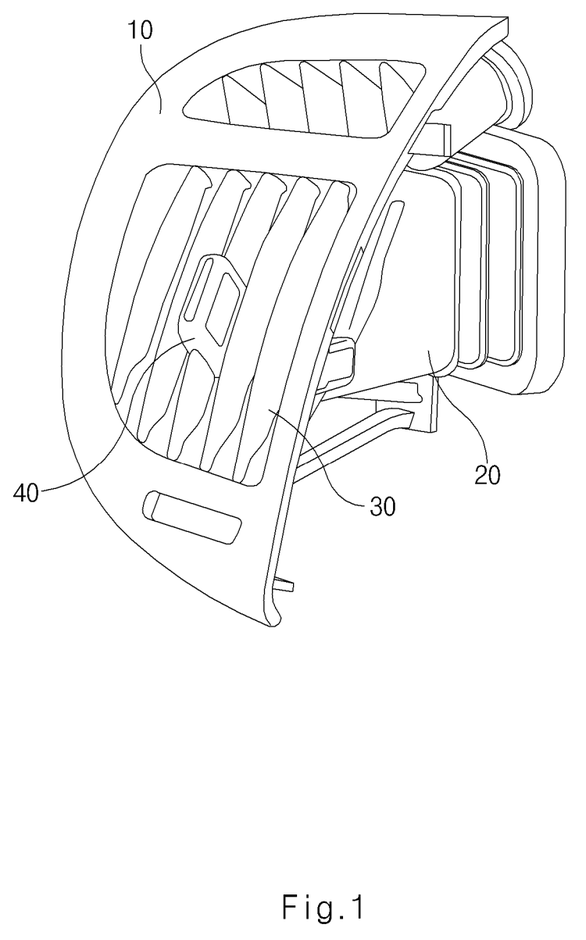
FIG. 1 is a perspective view of a wing knob adjusting device for an air vent according to the related art.
Figure 2:
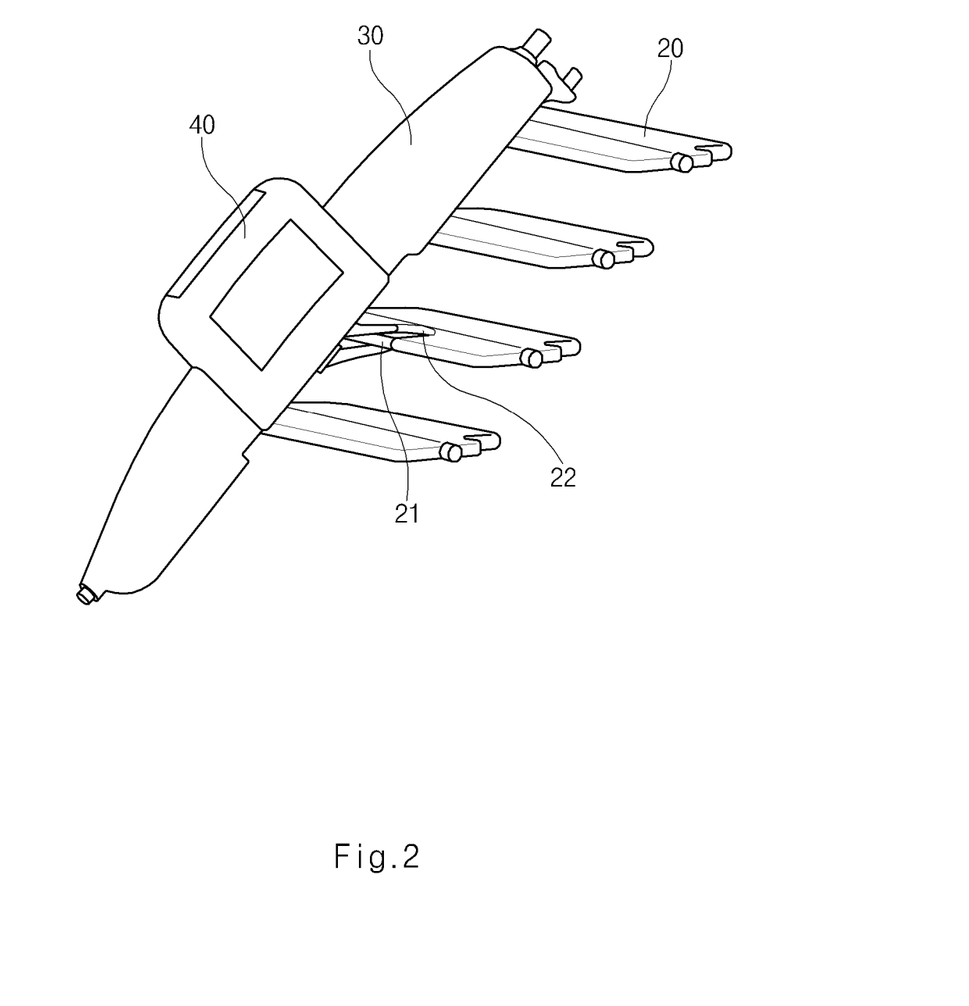
FIG. 2 is a perspective view of a coupling state between an actuating knob and a front wing according to the related art.
Figure 3:
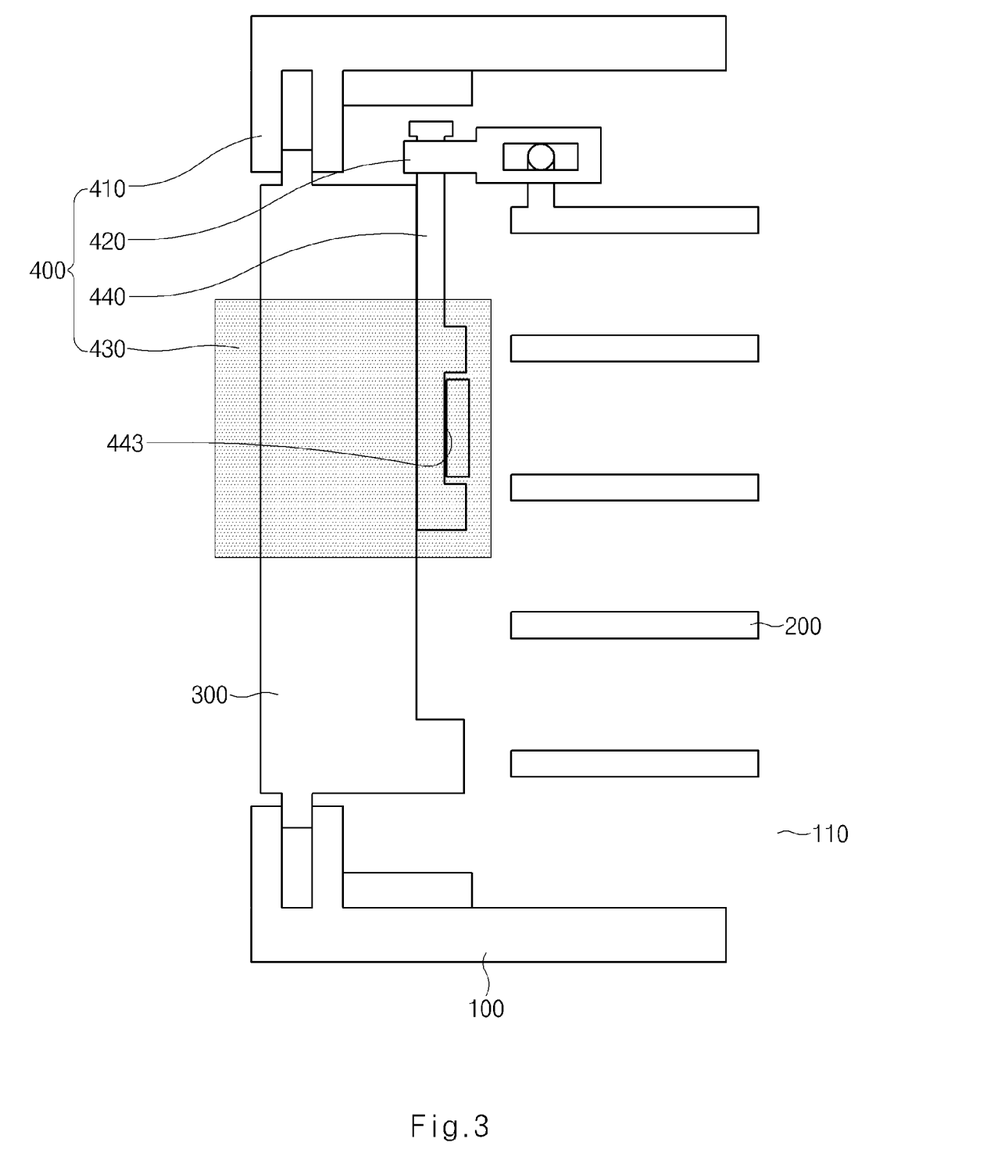
FIG. 3 is a diagram schematically showing a wing knob adjusting device for an air vent according to an exemplary embodiment of the present invention.
Figure 4:
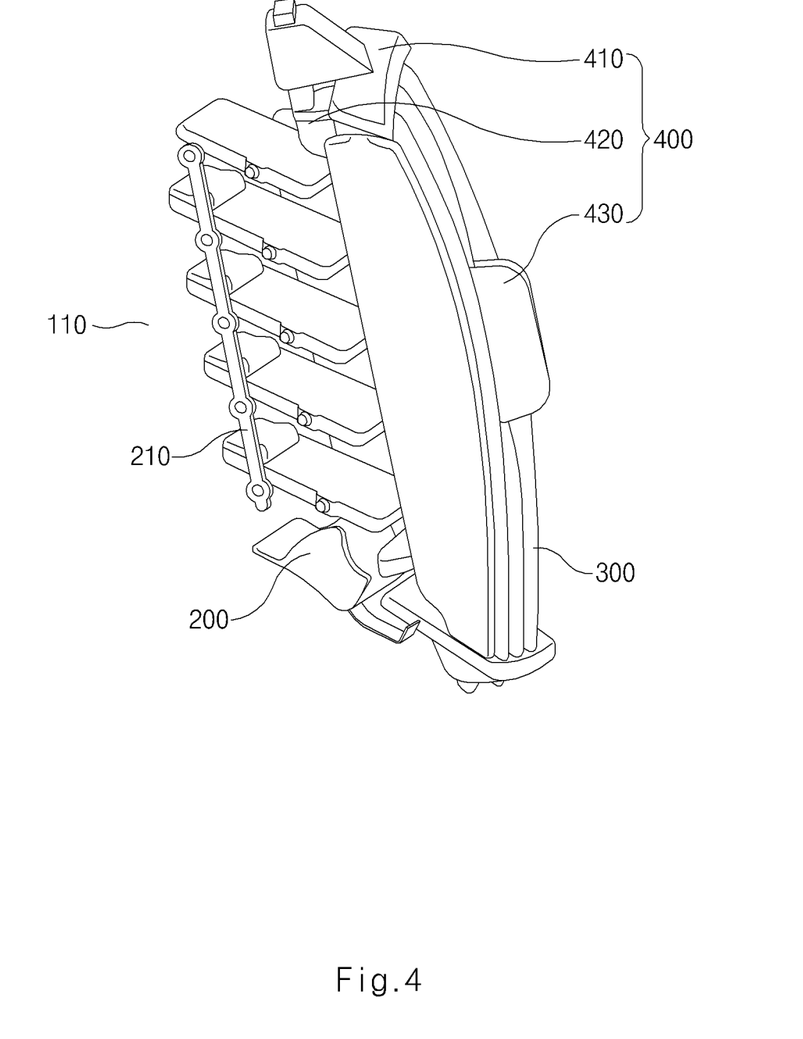
FIG. 4 is a perspective view of the wing knob adjusting device for an air vent according to the exemplary embodiment of the present invention.
Figure 5:
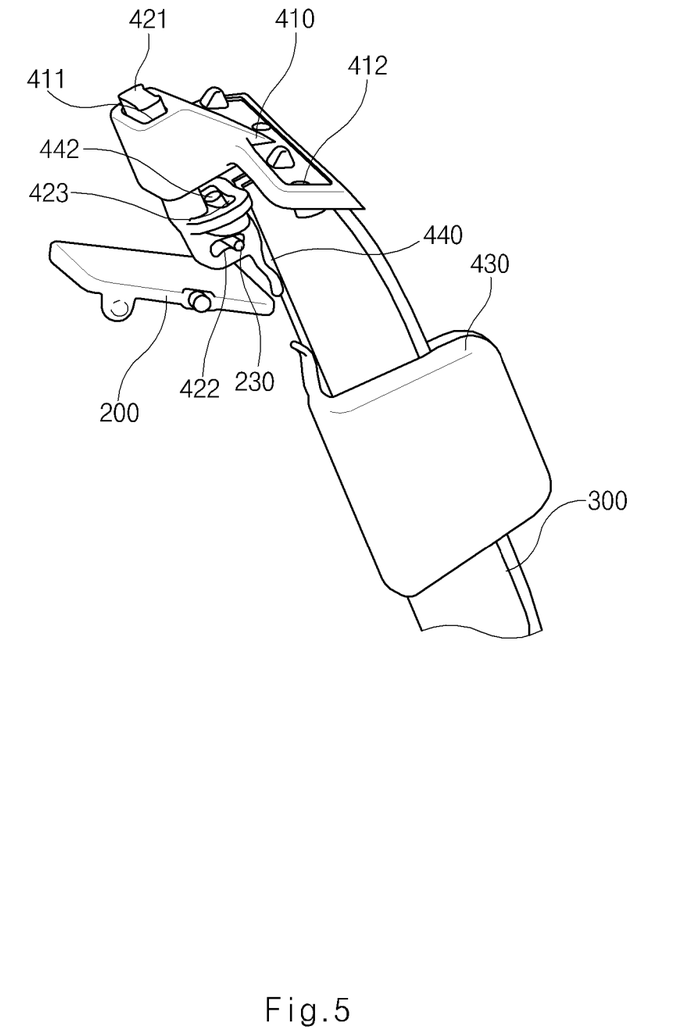
FIG. 5 is a side perspective view of the wing knob adjusting device for an air vent according to the exemplary embodiment of the present invention.
Figure 6:
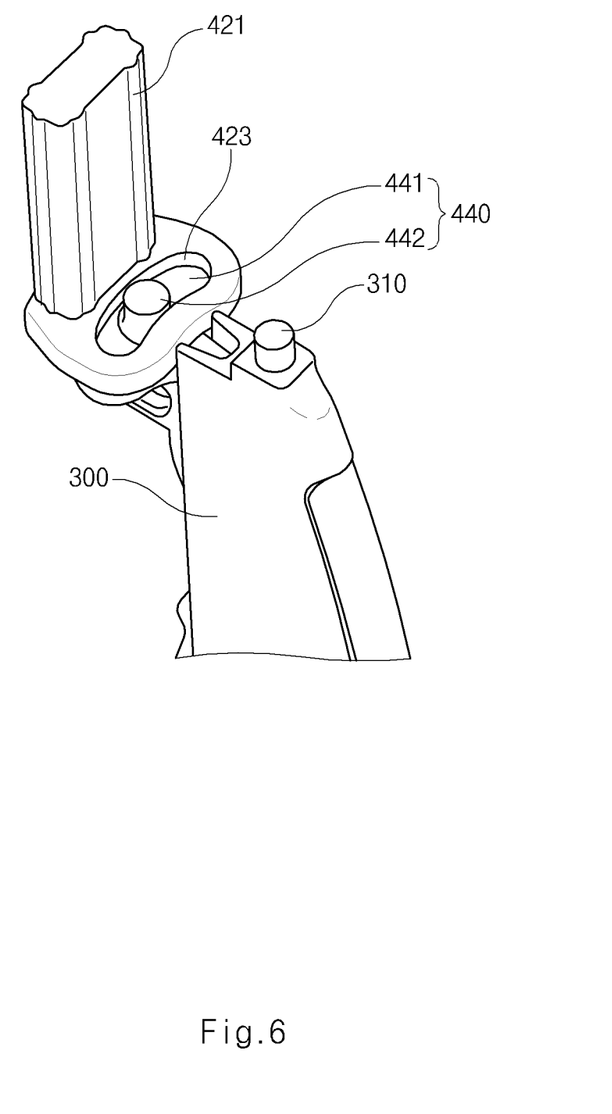
FIG. 6 is a partially enlarged view of the wing knob adjusting device for an air vent according to the exemplary embodiment of the present invention.
Figure 7:
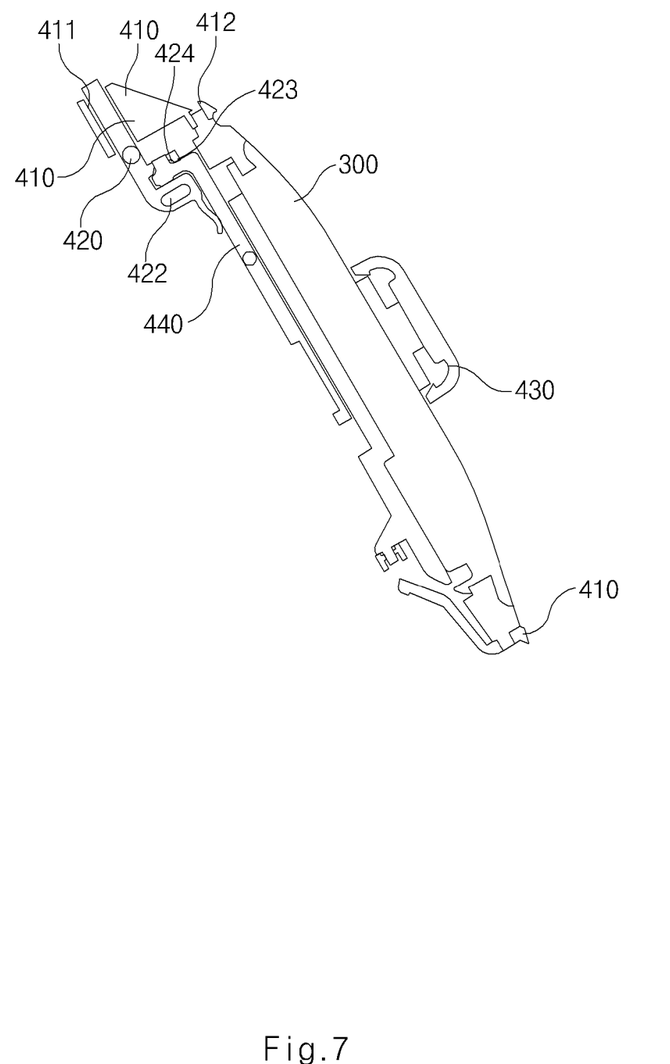
FIG. 7 is a cross-sectional view of the wing knob adjusting device for an air vent according to the exemplary embodiment of the present invention.

As shown in FIGS. 1 and 2, a wing knob adjusting device for an air vent for a vehicle according to the related art may include an air vent housing 10 forming an air outlet into which external air is introduced, a plurality of front wings 20 horizontally mounted rotatably in the air vent housing 10 to adjust a horizontal discharge direction of air, a plurality of rear wings 30 rotatably mounted vertically in front of the front wings 20 to adjust a vertical discharge direction of air, and an actuating knob 40 adjusting the plurality of front wings 20 and the plurality rear wings 30.

In this configuration, the actuating knob 40 includes a rear wing connector connected with the rear wing 30 so as to slidably move horizontally and a front wing connector mounted at a rear end of the rear wing connector and connected with a bar 21 of the front wing 20.

However, the wing knob adjusting device for an air vent for a vehicle according to the related art has a problem in that the front wing connector is separated from the bar 21 of the front wing 20 at the time of horizontally rotating the actuating knob 40, which causes a malfunction.

Further, noise occurs due to a friction of the front wing connector and the bar 21 of the front wing 20 and air is leaked to an actuating groove 22 of the front wing 20, to thereby degrade air volume control force.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a wing knob adjusting device for an air vent capable of increasing air volume control force by preventing wind from being leaked while improving a rotational structure of a wing knob for an air vent to increase its operability.

In an aspect of the present invention, a wing knob adjusting device for an air vent, may include a housing mounted with an air discharge part, a front wing mounted in the air discharge part of the housing to adjust a vertical discharge direction of air, a rear wing mounted in front of the front wing to adjust a horizontal discharge direction of air, and an actuator vertically rotating the front wing or horizontally rotating the rear wing, wherein the actuator may include fixing members mounted at top and bottom portions of the air discharge part, respectively, a knob link of which a top portion is upwardly inserted into the fixing member, a bottom portion is vertically coupled rotatably with the front wing, and a center is horizontally coupled rotatably with the rear wing, an actuating knob slidably mounted in the rear wing to rotate the knob link vertically or horizontally, and a connecting rod connecting the knob link with the actuating knob so as to interconnect the knob link and the actuating knob.

The fixing member is vertically formed with a rectangular hole, wherein a top portion of the knob link is mounted with a rectangular protrusion that is slidably inserted in the rectangular hole.

A bottom portion of the knob link is formed with a horizontal hole horizontally penetrating therethrough, and a top portion of the front wing is formed with a horizontal protrusion horizontally coupled with the horizontal hole of the knob link.

The center of the knob link is formed with a vertical groove vertically penetrating therethrough and is formed with a horizontal groove horizontally penetrating therethrough from the vertical groove, and a top portion of the connecting rod is mounted with a horizontal part coupled with the horizontal groove and a vertical protrusion mounted upwardly from the horizontal part and coupled with the vertical groove.

The horizontal groove is formed to may have an arc-shaped long groove.

The vertical groove is formed as an arc-shaped long hole to greatly increase a rotation direction of the vertical protrusion.

A bottom portion of the connecting rod is mounted with a fitting groove into which the actuating knob is fitted, to thereby interconnect the connecting rod at the time of vertically moving the actuating knob.

The plurality of front wings are vertically disposed and the plurality of vertically disposed front wings are operated to vertically interconnect one another by the connecting link.

A surface of the front wing is mounted with a wing sealing member sealing a gap between the front wings corresponding to each other at the time of rotating the front wing downwardly.

The wing sealing member may include a fixing part fixed to a top portion of a lower front wing among the plurality of front wings corresponding to one another and an attaching part closely supported to a rear surface of an upper front wing.

The rear surface of the upper front wing may include a downwardly inclined surface so as to closely attach the attaching part to the rear surface thereof.

The fixing member is longitudinally mounted with a plurality of through holes, and the top portion or the bottom portion of the rear wing is mounted with a coupling protrusion rotatably coupled with the through holes.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A wing knob adjusting device for an air vent according to an exemplary embodiment of the present invention having the above-mentioned objects and effects may include: a housing 100 forming an air discharge part 110, a front wing 200 mounted in the air discharge part 110 of the housing 100 to adjust a vertical discharge direction of air, a rear wing 300 mounted in front of the front wing 200 to control a horizontal discharge direction of air, and an actuator 400 vertically rotating the front wing 200, horizontally rotating the rear wing 300, or vertically rotating the front wing 200, wherein the actuator 400 includes fixing members 410 mounted at top and bottom portions of the air discharge part 110, respectively, a knob link 420 of which the top portion is upwardly inserted into the fixing member 410, the bottom portion is vertically rotatably coupled with the front wing 200, and the center is horizontally coupled rotatably with the rear wing 300, the rear wing 300 is slidably mounted with the actuating knob 430 to rotate the knob link 420 vertically or horizontally, and a connecting rod 440 connecting the knob link 420 with the actuating knob 430 so as to interconnect them.

The fixing member 410 vertically forms a rectangular hole 411 and a top portion of the knob link 420 is mounted with a rectangular protrusion slidably inserted into the rectangular hole 411.

The bottom portion of the knob link 420 is mounted with a horizontal hole 422 horizontally penetrating therethrough and the top portion of the front wing 200 is mounted with a horizontal protrusion 230 horizontally coupled into the horizontal groove 424.

A center of the knob link 420 is mounted with a vertical groove 423 vertically penetrating therethrough and is mounted with a horizontal groove 424 horizontally penetrating from the vertical groove 423 and a top portion of a connecting rod 440 is mounted with a horizontal part coupled with the horizontal groove 424 and a vertical protrusion coupled into the vertical groove 423 mounted upwardly from the horizontal part.

The vertical hole is formed as in an arc-shaped long hole to greatly increase a rotation direction of the vertical protrusion.

The center of the connecting rod 440 is mounted with a fitting groove into which the actuating knob 430 is fitted, to thereby interconnect the connecting rod 440 at the time of vertically moving the actuating knob 430.

The plurality of front wings 200 are disposed vertically and the plurality of front wings 200 vertically disposed are operated to vertically interconnect one another by the connecting link.

One surface of the front wing 200 is mounted with a wing sealing member sealing a gap among the front wings 200 corresponding to one another at the time of rotating the front wing 200 downwardly.

The wing sealing member includes a fixing part fixing to the top portion of the lower front wing among the front wings 200 corresponding to one another and an attaching part to closely support the wing sealing member to a side part of the upper front wing.

The rear surface of the upper front wing is formed of a downwardly inclined surface so as to closely attach the attaching part to the rear surface thereof.

The fixing member 410 is mounted with a plurality of longitudinal through grooves and the top portion or the bottom portion of the rear wing 300 is mounted with a coupling protrusion rotatably coupled with the through groove.

Hereinafter, the exemplary embodiments of the present invention will be described in detail with reference to the accompanying drawings so that they can be easily practiced by those skilled in the art to which the present invention pertains. However, the present invention may be implemented in various ways and is not limited to the exemplary embodiments described herein. In the accompanying drawings, portions unrelated to the description will be omitted in order to obviously describe the present invention, and similar reference numerals will be used to describe similar portions throughout the present specification.

The wing knob adjusting device for an air vent according to the exemplary embodiment of the present invention is configured to increase the adjusting performance and prevent wind from being leaked through the gap among the front wings 200 corresponding to each other, by vertically or horizontally adjusting the front wing and the lower wing by the actuator including the fixing member, the knob link, the actuating knob 430, and the connecting rod 440.

As shown in FIGS. 3 to 11, the wing knob adjusting device for an air vent according to the exemplary embodiment of the present invention as described above includes the housing 100 forming the air discharge part 110, a front wing 200 mounted in the air discharge part 110 of the housing 100 to adjust the vertical discharge direction of air, a rear wing 300 mounted in front of the front wing 200 to adjust the horizontal discharge direction of air, and an actuator 400 vertically rotating the front wing 200 or horizontally rotating the rear wing 300.

The housing 100 according to the exemplary embodiment of the present invention is connected with an air duct connected with the outside and forms the air discharge part 110 discharging the outside air introduced from the air duct to an interior room of a vehicle.

The front wing 200 of the exemplary embodiment of the present invention includes the air discharge part 110 of the housing 100 to adjust air passing through the air discharge part 110 to face upwards or downwards and the plurality of front wings 200 are vertically disposed at equidistance in the air discharge part 110 and the plurality of front wings 200 are operated to vertically interconnect one another by the connecting link 210 connected with a side portion thereof.

In this configuration, a wing sealing member 220 for sealing a gap among the front wings 200 corresponding to one another is mounted between the plurality of front wings 200 at the time of rotating the plurality of front wings 200 downwardly.

Figure 8:
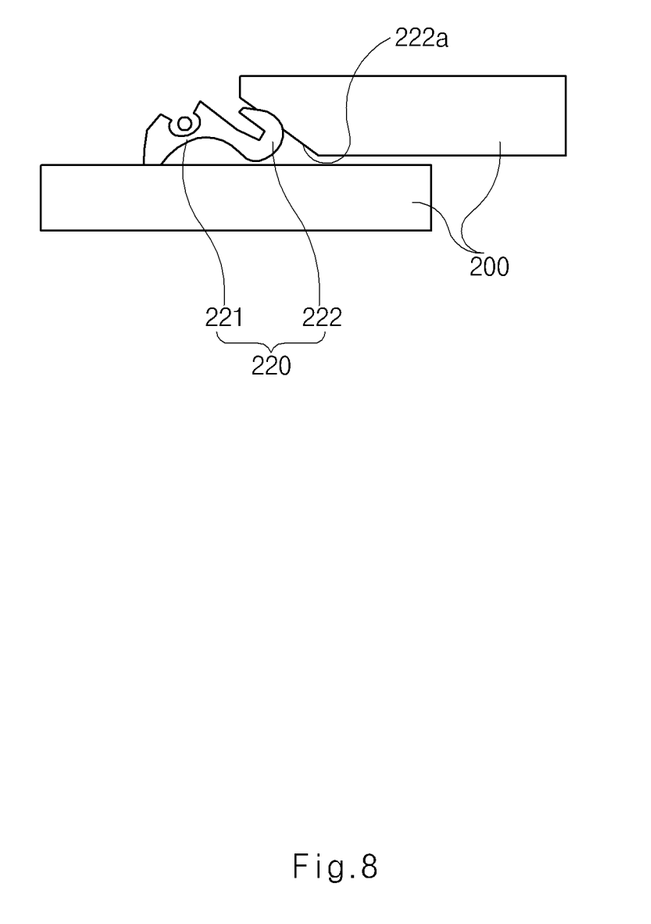
FIG. 8 is a cross-sectional view of a front wing of the wing knob adjusting device for an air vent according to the exemplary embodiment of the present invention.
Figure 9:
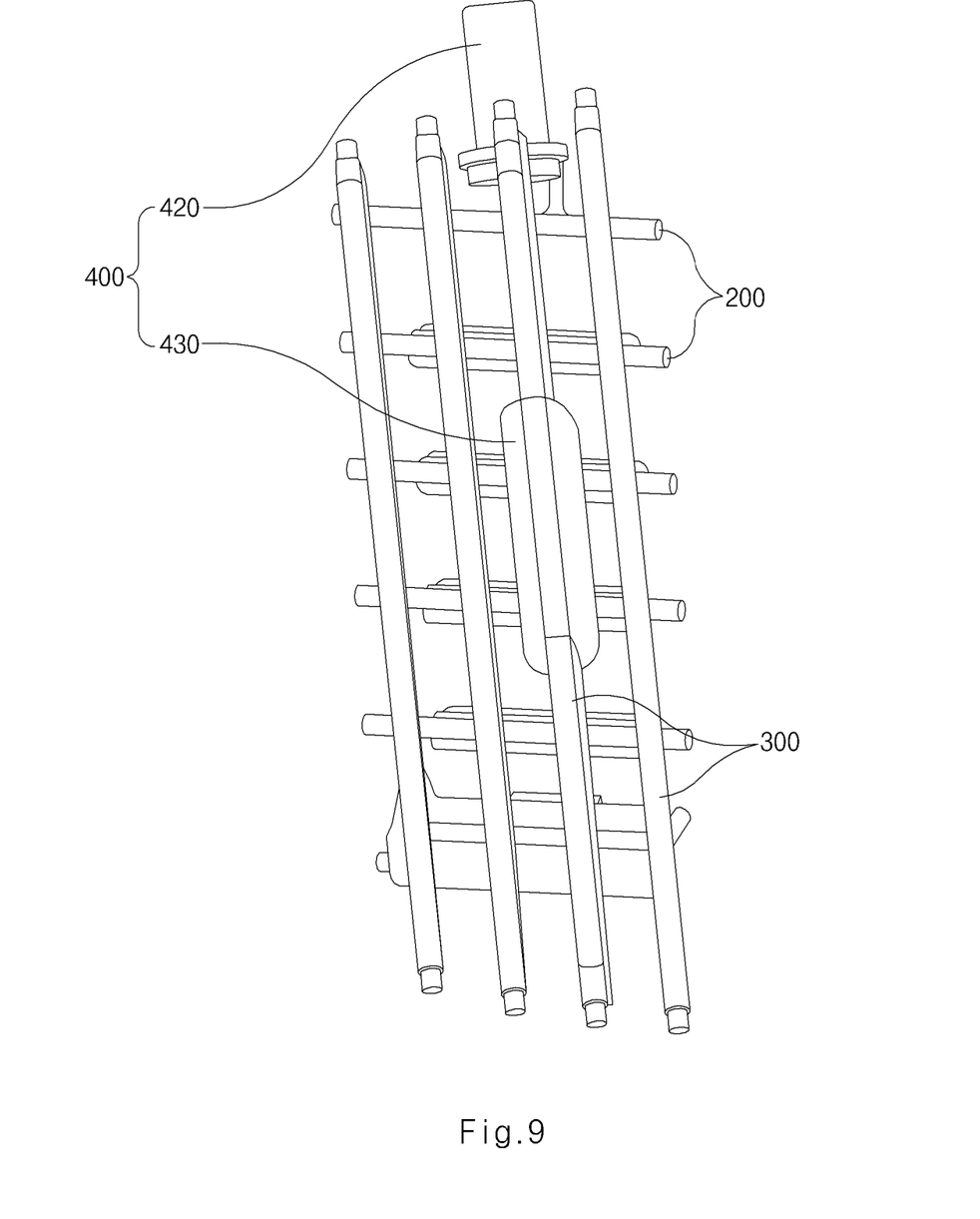
FIG. 9 is a diagram showing a normal status of the wing knob adjusting device for an air vent according to the exemplary embodiment of the present invention.
Figure 10:
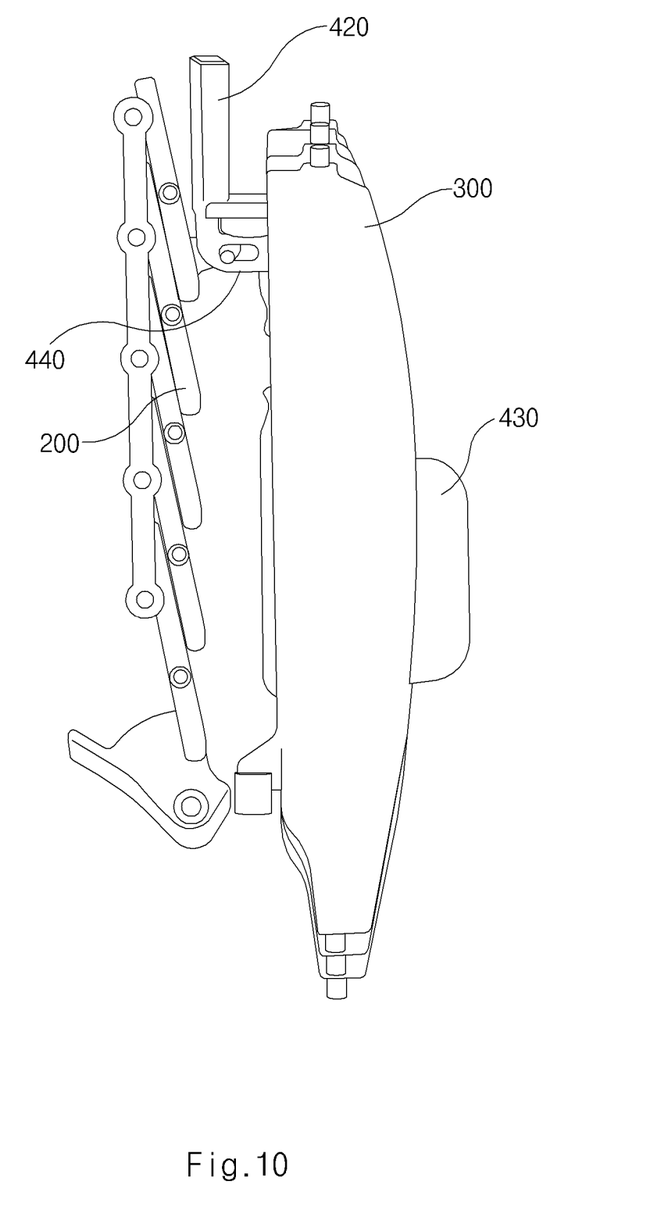
FIG. 10 is a diagram showing a full cross status of the front wing of the wing knob adjusting device for an air vent according to the exemplary embodiment of the present invention.
Figure 11:
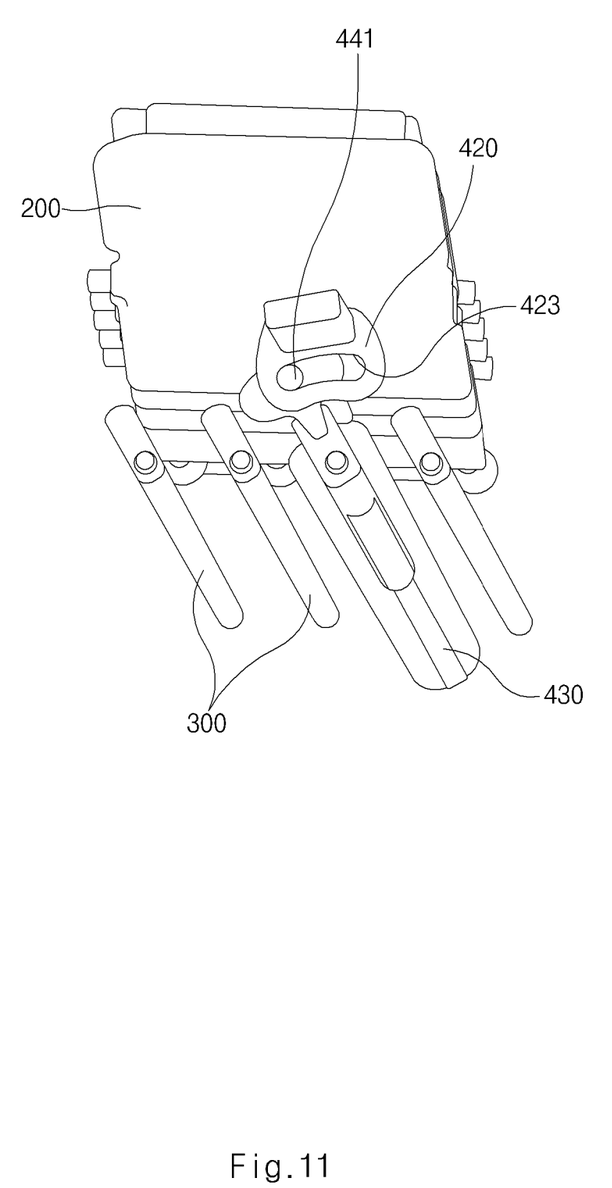
FIG. 11 is a diagram showing a right status of a rear wing of the wing knob adjusting device for an air vent according to the exemplary embodiment of the present invention.

As shown in FIG. 8, the wing sealing member 220 is fixed to the top portion of the front wing 200 disposed at the bottom portion thereof among the front wings 200 corresponding to one another and is formed of a fixing part 221 closely attached to the top portion of the front wing 200 disposed on the bottom portion thereof and an attaching part 222 closely attached to a rear portion of the front wing 200 disposed at the top portion thereof.

In this configuration, the rear surface of the front wing 200 disposed on the top portion thereof is formed of a downwardly inclined surface 222a so as to closely attach the attaching part 222 to the rear surface thereof, which significantly prevents air from being leaked.

Therefore, the wing sealing member 220 seals the gap among the front wings 200 corresponding to one another and prevents air from being leaked by closely attaching the fixing part 221 and the attaching part 222 to the front wing 200 disposed at the top and bottom portions thereof, respectively, at the time of moving the plurality of front wings 200 downwardly.

The rear wing 300 according to the exemplary embodiment of the present invention, which is configured to adjust air passing through the air discharge part 110 to face the left or the right, is mounted at the front surface of the front wing 200.

That is, the plurality of rear wings 300 are horizontally disposed at equidistance at the front surface of the front wings 200 and the plurality of rear wings 300 are connected with one another so as to horizontally interconnect one another by the link member and is horizontally fixed rotatably to the fixing member to be described.

In this configuration, the fixing member will be described below in detail and therefore, will be omitted herein.

An actuator 400 according to the exemplary embodiment of the present invention may include fixing members 410 mounted at the top and bottom portions of the air discharge part 110, respectively, a knob link 420 of which the top portion is upwardly inserted into the fixing member 410, the bottom portion is vertically rotatably coupled with the front wing 200, and the center is horizontally coupled rotatably with the rear wing 300, an actuating knob 430 slidably mounted in the rear wing 300 and vertically or horizontally rotating the knob link 420, and a connecting rod 440 connecting the knob link 420 with the actuating knob 430 so as to interconnect them.

The fixing members 410 are mounted to correspond to the top and bottom portions of the air discharge part 110, respectively and is vertically mounted with rectangular holes 411 into which the knob link 420 to be described below is slidably inserted. In this case, the knob link 420 can vertically slidably move through the rectangular holes 411 in the state in which the knob link 420 is not rotated.

Further, the fixing member 410 is longitudinally mounted with the plurality of through holes 412 and rotating protrusions 310 mounted on the top portion or the bottom portion of the rear wing 300 each are rotatably inserted in the plurality of through holes 412.

The top portion of the knob link 420 is mounted with a rectangular protrusion 421 that is slidably inserted into the rectangular hole 411, such that the knob link 420 is stably slid vertically through the rectangular protrusion 421.

Further, the bottom portion of the knob link 420 is mounted with a horizontal hole 422 horizontally penetrating therethrough. As a result, even though a vertical rotating angle of the front wing 200 is large, it is possible to prevent a horizontal protrusion 230 of the front wing 200 from separating from the horizontal hole 422 of the knob link 420 by coupling the horizontal protrusion 230 horizontally mounted on the top portion of the front wing 200 with the horizontal hole 422, to thereby implement the stable operation.

In addition, the center of the knob link 420 is mounted with a vertical groove 423 vertically penetrating therethrough and is mounted with a horizontal groove 424 horizontally penetrating therethrough from the vertical groove 423.

That is, the coupling strength between the connecting rod 440 and the knob link 420 is increased by coupling the vertical groove 423 with the connecting rod 440 to be described below through the horizontal groove 424.

That is, even though the knob link 420 rotates vertically or horizontally, the separation of the connecting rod 440 can be prevented, to thereby implement the stable operation.

The actuating knob 430 is coupled with any one of the plurality of rear wings 300 in a form surrounding the rear wing 300 and is mounted to slidably move vertically, to thereby vertically or horizontally rotate the knob link 420 at the time of vertically or horizontally rotating the actuating knob 430. As a result, the front wing 200 connected with the knob link 420 rotates vertically or the rear wing 300 rotates horizontally.

The rear end of the actuating knob 430 is coupled with the connecting rod 440 to be described below so as to interconnect the knob node 430 with the connecting rod 440.

The connecting rod 440 is to connect the actuating knob 430 with the knob link 420 so as to interconnect them and the top portion thereof is mounted with a horizontal part 441 coupled with the horizontal groove 424 and a vertical protrusion 442 mounted upwardly from the horizontal part 441 and coupled with the vertical groove 423 to couple the connecting rod 440 with the knob link 420 so as to interconnect them.

Further, the bottom portion of the connecting rod 440 is mounted with a fitting groove 443 into which the actuating knob 430 is fitted, to thereby interconnect the connecting rod 440 at the time of vertically moving the actuating knob 430.

In this configuration, the horizontal groove 424 is formed to have an arc-shaped long groove. As a result, the rotation radius of the rear wing 300 is increased by increasing the rotating radius of the connecting rod 440, to thereby make a horizontal control angle of wind large.

That is, when vertically moving the actuating knob 430, the connecting rod 440 moves vertically, the knob link 420 moves vertically by the connecting rod 440, and the front wing 200 vertically rotates by the knob link 420 to adjust a wind direction upwardly or downwardly.

As set forth above, according to the exemplary embodiments of the present invention, the operability can be increased by improving the rotational structure of the wing knob for an air vent and the air volume control force can be increased by preventing wind from being leaked.

It should be interpreted that the scope of the present invention is defined by the following claims rather than the above-mentioned detailed description and all modifications or alterations deduced from the meaning, the scope, and equivalences of the claims are included in the scope of the present invention.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wing knob adjusting device for an air vent, comprising:
   a housing mounted with an air discharge part;
   a front wing mounted in the air discharge part of the housing to adjust a vertical discharge direction of air;
   a rear wing mounted in front of the front wing to adjust a horizontal discharge direction of air; and
   an actuator vertically rotating the front wing or horizontally rotating the rear wing,
   wherein the actuator includes:
      an actuating knob slidably mounted in the rear wing and selectively rotated with the rear wing;
      a connecting rod connected to the actuating knob and moved upward and downward and rotated along with the actuating knob;
      a knob link forming a horizontal groove connected with the connecting rod to transmit upward and downward force of the connecting rod to the front wing and a vertical groove connected with the connecting rod not to transmit rotating force of the connecting rod to the front wing; and
      fixing members mounted at top and bottom portions of the air discharge part, and slidably connected to the knob link,
   wherein the fixing member is vertically formed with a rectangular hole, and
   wherein a top portion of the knob link is mounted with a rectangular protrusion that is slidably inserted in the rectangular hole.

2. The wing knob adjusting device for the air vent according to claim 1, wherein a bottom portion of the knob link is formed with a horizontal hole horizontally penetrating therethrough, and
   wherein a top portion of the front wing is formed with a horizontal protrusion horizontally coupled with the horizontal hole of the knob link.

3. The wing knob adjusting device for the air vent according to claim 1, wherein a center of the knob link is formed with the vertical groove vertically penetrating therethrough and is formed with the horizontal groove horizontally penetrating therethrough from the vertical groove, and
   a top portion of the connecting rod is mounted with a horizontal part coupled with the horizontal groove and a vertical protrusion mounted upwardly from the horizontal part and coupled with the vertical groove.

4. The wing knob adjusting device for the air vent according to claim 3, wherein the horizontal groove is formed to have an arc-shaped long groove.

5. The wing knob adjusting device for the air vent according to claim 3, wherein the vertical groove is formed as an arc-shaped long hole to greatly increase a rotation direction of the vertical protrusion.

6. The wing knob adjusting device for the air vent according to claim 1,
   wherein a bottom portion of the connecting rod is mounted with a fitting groove into which the actuating knob is fitted, to thereby interconnect the connecting rod at the time of vertically moving the actuating knob.

7. The wing knob adjusting device for the air vent according to claim 1, wherein a plurality of front wings are vertically disposed and the plurality of vertically disposed front wings are operated to vertically interconnect one another by a connecting link.

8. The wing knob adjusting device for the air vent according to claim 7, wherein a surface of the front wing is mounted with a wing sealing member sealing a gap between the front wings corresponding to each other at the time of rotating the front wing downwardly.

9. The wing knob adjusting device for the air vent according to claim 8, wherein the wing sealing member includes a fixing part fixed to a top portion of a lower front wing among the plurality of front wings corresponding to one another and an attaching part closely supported to a rear surface of an upper front wing.

10. The wing knob adjusting device for the air vent according to claim 9, wherein the rear surface of the upper front wing includes a downwardly inclined surface so as to closely attach the attaching part to the rear surface thereof.

11. The wing knob adjusting device for the air vent according to claim 1, wherein the fixing member is longitudinally mounted with a plurality of through holes, and the top portion or the bottom portion of the rear wing is mounted with a coupling protrusion rotatably coupled with the through holes.

* * * * *